US010613394B2

(12) United States Patent
Gao et al.

(10) Patent No.: US 10,613,394 B2
(45) Date of Patent: Apr. 7, 2020

(54) DISPLAY DEVICE

(71) Applicant: BOE TECHNOLOGY GROUP CO., LTD., Beijing (CN)

(72) Inventors: Jian Gao, Beijing (CN); Xiaochuan Chen, Beijing (CN); Yafeng Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 120 days.

(21) Appl. No.: 15/558,709

(22) PCT Filed: Mar. 9, 2017

(86) PCT No.: PCT/CN2017/076075
§ 371 (c)(1),
(2) Date: Sep. 15, 2017

(87) PCT Pub. No.: WO2017/206563
PCT Pub. Date: Dec. 7, 2017

(65) Prior Publication Data
US 2018/0188612 A1    Jul. 5, 2018

(30) Foreign Application Priority Data

Jun. 2, 2016  (CN) .......................... 2016 1 0388944

(51) Int. Cl.
*G02F 1/1343*    (2006.01)
*G02F 1/1347*    (2006.01)
(Continued)

(52) U.S. Cl.
CPC ........ *G02F 1/134309* (2013.01); *G02F 1/136* (2013.01); *G02F 1/13439* (2013.01);
(Continued)

(58) Field of Classification Search
None
See application file for complete search history.

(56) References Cited

U.S. PATENT DOCUMENTS

| 2013/0120366 A1* | 5/2013 | Lee ...................... H04N 13/305 345/419 |
| 2013/0208196 A1* | 8/2013 | Kim .................. G02F 1/134309 349/15 |
| 2014/0152926 A1* | 6/2014 | Takahashi .......... G02B 27/2214 349/15 |

FOREIGN PATENT DOCUMENTS

| CN | 104199193 A | 12/2014 |
| CN | 105572930 A | 5/2016 |

(Continued)

OTHER PUBLICATIONS

Search Report for International Application No. PCT/CN2017/076075 dated Jun. 5, 2017.

*Primary Examiner* — Phu Vu
(74) *Attorney, Agent, or Firm* — Calfee, Halter & Griswold LLP

(57) ABSTRACT

A display device is provided, including a display panel; a controller; and an auxiliary panel disposed at a light emitting side of the display panel, the auxiliary panel including a first liquid crystal layer, a first substrate and a second substrate, the first liquid crystal layer being encapsulated between the first substrate and the second substrate, the first substrate including a first base substrate and a first transparent electrode layer, and the second substrate including a second base substrate and a second transparent electrode layer, wherein the controller is configured to provide a control signal to the first and second transparent electrode layers to cause different regions of the first liquid crystal layer to have different refractive indices, such that light transmitted from the display panel forms an image on a curved surface having an (Continued)

opening facing the light emitting direction of the display device.

19 Claims, 13 Drawing Sheets

(51) Int. Cl.
*G02F 1/1335* (2006.01)
*G02F 1/136* (2006.01)
*G02F 1/29* (2006.01)

(52) U.S. Cl.
CPC .... *G02F 1/13471* (2013.01); *G02F 1/133528* (2013.01); *G02F 2001/294* (2013.01)

(56) References Cited

FOREIGN PATENT DOCUMENTS

| | | |
|---|---|---|
| CN | 105589277 A | 5/2016 |
| CN | 105866998 A | 8/2016 |
| CN | 205679880 U | 11/2016 |
| JP | 2006030229 A | 2/2006 |

* cited by examiner

DISPLAY DEVICE

CROSS-REFERENCE TO RELATED APPLICATIONS

The present application is based upon International Application No. PCT/CN2017/076075, filed on Mar. 9, 2017, which is based upon and claims priority to Chinese Patent Application No. 201610388944.X, titled "display device", and filed Jun. 2, 2016, the entire contents of which are incorporated herein by reference.

TECHNICAL FIELD

The present disclosure relates to the field of display technology, and more particularly, to a display device.

BACKGROUND

Existing display devices may be divided into flat display devices and curved display devices. Flat display devices may save physical space, but have undesirable light distribution properties. Particularly, when a flat display device is placed right before human eyes, if the viewing distance from two sides of the flat display device increases, light intensity may be gradually decreased, resulting in an undesirable experience for the viewing angles of the human eyes. Especially for a large sized flat display device, this effect is more significant. A curved display device has a curved display surface. Therefore, it may mitigate the above effect. However, the curved display device may have defects such as a large size and being difficult to be installed.

Therefore, how to realize a curved display without increasing the installation size of the display device becomes a technical problem that needs to be solved in the art.

SUMMARY

The present disclosure provides a display device comprising a display panel. The display device also includes a controller and an auxiliary panel disposed at a light emitting side of the display panel, the auxiliary panel comprising a first liquid crystal layer, a first substrate and a second substrate disposed opposite to each other to form a cell, the first liquid crystal layer being encapsulated between the first substrate and the second substrate, the first substrate comprising a first base substrate and a first transparent electrode layer disposed on the first base substrate, and the second substrate comprising a second base substrate and a second transparent electrode layer disposed on the second base substrate, wherein the controller is capable of providing a control signal to the first transparent electrode layer and the second transparent electrode layer to cause different regions on the first liquid crystal layer to have different refractive indices, such that light transmitted from the display panel forms an image on a curved surface having an opening facing the light emitting direction of the display device.

In one embodiment, when the controller does not provide a control signal to the first transparent electrode layer and the second transparent electrode layer, the refractive index is the same for all the regions of the first liquid crystal layer.

In one embodiment, the display panel comprises a plurality of pixel units arranged in multiple rows and multiple columns, the first transparent electrode layer is a planar electrode covering the first base substrate, the second transparent electrode layer comprises a plurality of second transparent electrode columns, each column of pixel units corresponds to at least one of the second transparent electrode columns, and the controller is configured to be capable of providing a control signal to the first transparent electrode layer and the second transparent electrode columns to cause the refractive index of any portion of the first liquid crystal layer corresponding to one of the second transparent electrode columns to gradually increase from either side of the second transparent electrode column to the middle of the second transparent electrode column in a width direction, to form an equivalent positive lens, and to cause focal lengths of the equivalent lenses formed by the respective portions of the first liquid crystal layer to gradually decrease from either side of the auxiliary panel to the middle of the auxiliary panel in a width direction of the auxiliary panel.

In one embodiment, the control signal provided by the controller is capable of causing focal lengths of the equivalent positive lenses formed by the portions of the first liquid layer corresponding to respective second transparent electrode columns on the auxiliary panel to be larger than a distance between the display panel and the auxiliary panel.

In one embodiment, each column of pixel units corresponds to one second transparent electrode column, and an aperture ratio of the display panel gradually increases from the middle of the display panel to either side of the auxiliary panel.

In one embodiment, the control signal provided by the controller is capable of causing focal lengths of the equivalent positive lenses formed by the portions of the first liquid layer corresponding to respective second transparent electrode columns on the auxiliary panel to be smaller than a distance between the display panel and the auxiliary panel.

In one embodiment, each column of pixel units corresponds to one second transparent electrode column, and an aperture ratio of the display panel gradually decreases from the middle of the display panel to either side of the auxiliary panel.

In one embodiment, the pixel unit comprises a plurality of sub-pixels, each column of sub-pixels corresponds to at least one of the second transparent electrode columns, and the controller is configured to be capable of providing a same control signal to the plurality of second transparent electrode columns corresponding to the same column of pixel units.

In one embodiment, the pixel unit comprises a plurality of sub-pixels, each column of sub-pixels corresponds to at least one of the second transparent electrode columns, and the controller is configured to be capable of providing a control signal to the first transparent electrode layer and the respective second transparent electrode columns, to cause focal lengths of the equivalent lenses formed by the portions of the first liquid crystal layer corresponding to the columns of sub-pixel units on one side of the auxiliary panel to be different from one another, and cause focal lengths of the equivalent lenses formed by the portions of the first liquid crystal layer corresponding to the columns of sub-pixel units on the auxiliary panel to be symmetrically distributed with respect to the center line in the width direction of the auxiliary panel.

In one embodiment, the auxiliary panel is divided into three parts along the width direction of the auxiliary panel, and the control signal provided by the controller is capable of causing focal lengths of the portions in the first liquid crystal layer corresponding to either side of the auxiliary panel to be smaller than the distance between the auxiliary panel and the display panel, and causing focal lengths of the equivalent positive lenses formed by the portions of the first liquid crystal layer in the middle of the width direction of the auxiliary panel to be larger than the distance between the auxiliary panel and the display panel.

In one embodiment, for the portions of the display panel corresponding to two lateral portions of the auxiliary panel, from the middle of the width direction of the display panel to either side of the width direction of the display panel, the aperture ratio of the display panel gradually decreases, and for the portion of the display panel corresponding to middle portion of the auxiliary panel, from the middle of the width direction of the display panel to either side of the width direction of the display panel, the aperture ratio of the display panel gradually increases.

In one embodiment, each pixel unit comprises a plurality of sub-pixels, each column of sub-pixels corresponds to one of the second transparent electrode columns, and focal lengths of the equivalent positive lenses formed by the second transparent electrode columns corresponding to different sub-pixels in the same pixel unit are the same.

In one embodiment, the display panel comprises a plurality of pixel units arranged in a plurality of rows and columns, the first transparent electrode layer is a planar electrode covering the first base substrate, the second transparent electrode layer comprises a plurality of second transparent electrode columns, each column of pixel units corresponds to at least one of the second transparent electrode columns, and the controller is configured to be capable of providing a control signal to the first transparent electrode layer and the respective second transparent electrode columns, to cause the refractive index of each portion of the first liquid crystal layer corresponding to the respective second transparent electrode column to gradually decrease from either side of the width direction of the second transparent electrode column to the middle of the second transparent electrode column to form an equivalent negative lens, and cause the focal lengths of the equivalent negative lenses formed by the portions of the first liquid crystal layer to gradually increase from either side to the middle of the auxiliary panel in the width direction of the auxiliary panel.

In one embodiment, the auxiliary panel is divided into three parts in the width direction, the display panel includes a plurality of pixel units arranged in a plurality of rows and columns, the first transparent electrode layer is a planar electrode covering the first base substrate, the second transparent electrode layer comprises a plurality of second transparent electrode columns, each column of pixel units corresponds to at least one second transparent electrode column, and the controller is configured to be capable of providing a control signal to the first transparent electrode layer and the respective second transparent electrode columns, to cause the refractive index of each portion of the first liquid crystal layer corresponding to the respective second transparent electrode column at either side of the auxiliary panel to gradually decrease from either side of the width direction of the second transparent electrode column to the middle of the second transparent electrode column to form an equivalent positive lens, and cause the refractive index of each portion of the first liquid crystal layer corresponding to the respective second transparent electrode column in the middle of the auxiliary panel to gradually increase from either side of the width direction of the second transparent electrode column to the middle of the second transparent electrode column to form an equivalent negative lens.

In one embodiment, the auxiliary panel is divided into three parts in the width direction, the display panel includes a plurality of pixel units arranged in a plurality of rows and columns, the first transparent electrode layer is a planar electrode covering the first base substrate, the second transparent electrode layer comprises a plurality of second transparent electrode columns, each column of pixel units corresponds to at least one second transparent electrode column, and the controller is configured to be capable of providing a control signal to the first transparent electrode layer and the respective second transparent electrode columns, to cause the refractive index of each portion of the first liquid crystal layer corresponding to the respective second transparent electrode column at either side of the auxiliary panel to gradually increase from either side of the width direction of the second transparent electrode column to the middle of the second transparent electrode column to form an equivalent positive lens, and cause the refractive index of each portion of the first liquid crystal layer corresponding to the respective second transparent electrode column in the middle of the auxiliary panel to gradually decrease from either side of the width direction of the second transparent electrode column to the middle of the second transparent electrode column to form an equivalent negative lens.

In one embodiment, each of the second transparent electrode columns comprises one or more strip-like transparent electrode strips.

In one embodiment, each of the second transparent electrode columns comprises a plurality of second transparent electrodes, each of the second transparent electrodes corresponds to one pixel unit, and each second transparent electrode comprises a plurality of concentric second transparent electrode rings.

In one embodiment, the display panel is a liquid crystal panel, the display panel comprises a first polarizer and a second polarizer, the first polarizer is disposed at a light incident side of the display panel, and the second polarizer is disposed at the light emitting side of the display panel, and the initial arrangement direction of the first liquid crystal layer of the auxiliary panel is parallel to the polarizing direction of the second polarizer.

In one embodiment, the display panel is an organic light emitting diode display panel, the display device further comprises an adjustment panel disposed on the light emitting side of the display panel and is stacked with the auxiliary panel, the adjustment panel comprises a third substrate and a fourth substrate disposed opposite to each other to form a cell, and a second liquid crystal layer encapsulated between the third substrate and the fourth substrate, the initial arrangement direction of the second liquid crystal layer is perpendicular to the initial arrangement direction of the liquid crystal layer, the third substrate includes a third base substrate and a third transparent electrode layer, the fourth substrate includes a fourth base substrate and a fourth transparent electrode layer, the third transparent electrode layer is disposed on the third base substrate in a manner similar to that of the first transparent electrode layer on the first base substrate, the fourth transparent electrode layer is disposed on the fourth base substrate in the same manner as the second transparent electrode layer on the second base substrate, and the controller is capable of providing to the adjustment panel with the same signal as that to the auxiliary panel.

BRIEF DESCRIPTION OF THE DRAWINGS

The accompanying drawings, which are included to provide a further understanding of the present disclosure and are incorporated in and constitute a part of this application, illustrate the present disclosure together with the following detailed description, but are not to be construed as limiting the scope of the disclosure. In the drawings.

DETAILED DESCRIPTION

Hereinafter, specific embodiments of the present disclosure will be described in detail with reference to the accompanying drawings. It is to be understood that the specific embodiments described herein are for the purpose of illustration and explanation only and are not intended to limit the present disclosure.

It should be noted that, the term "width" as used herein refers to a lateral direction when a display device is in use, that is, a left-to-right direction as shown in FIGS. 9-23.

Figure 1:
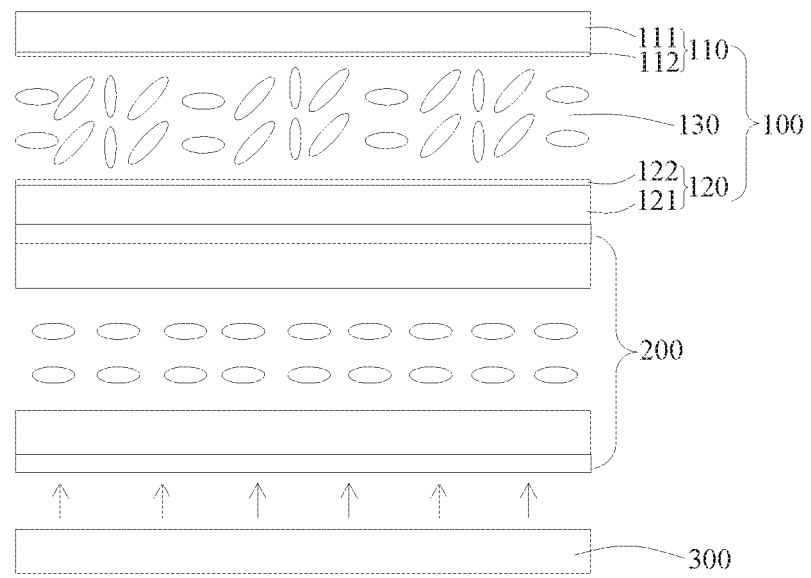
FIG. 1 is a structural schematic diagram of a display device provided by the present disclosure, the display panel being a liquid crystal display panel.

The present disclosure provides a display device. As shown in FIG. 1, the display device includes a display panel 200. The display panel also includes a controller (not shown) and an auxiliary panel 100 at a light emitting side of the display panel 200. The auxiliary panel 100 includes a first liquid crystal layer 130, a first substrate 110 and a second substrate 120 disposed opposite to each other to form a cell. The first liquid crystal layer 130 is encapsulated between the first substrate 110 and the second substrate 120.

Figure 6:
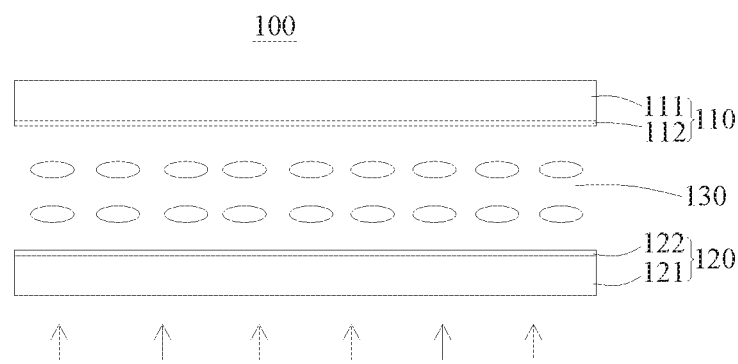
FIG. 6 is a diagram illustrating arrangement of liquid crystal molecules when the auxiliary panel is not applied with a voltage.

As shown in FIGS. 1 and 6, the first substrate 110 includes a first base substrate 111 and a first transparent electrode layer 112 disposed on the first base substrate 111. The second substrate 120 includes a second base substrate 121 and a second transparent electrode layer 122 disposed on the second base substrate 121. The controller is capable of providing a control signal to the first transparent electrode layer 112 and the second transparent electrode layer 122 to cause different regions of the first liquid crystal layer 130 to have different refractive indices, such that the light transmitted from the display panel 200 forms an image on a curved surface having an opening facing the light emitting direction of the display device.

A control signal may be applied to the first transparent electrode layer 112 and the second transparent electrode layer 122 by the controller, to cause a region corresponding to the second transparent electrode column to form an equivalent lens.

Figure 2:
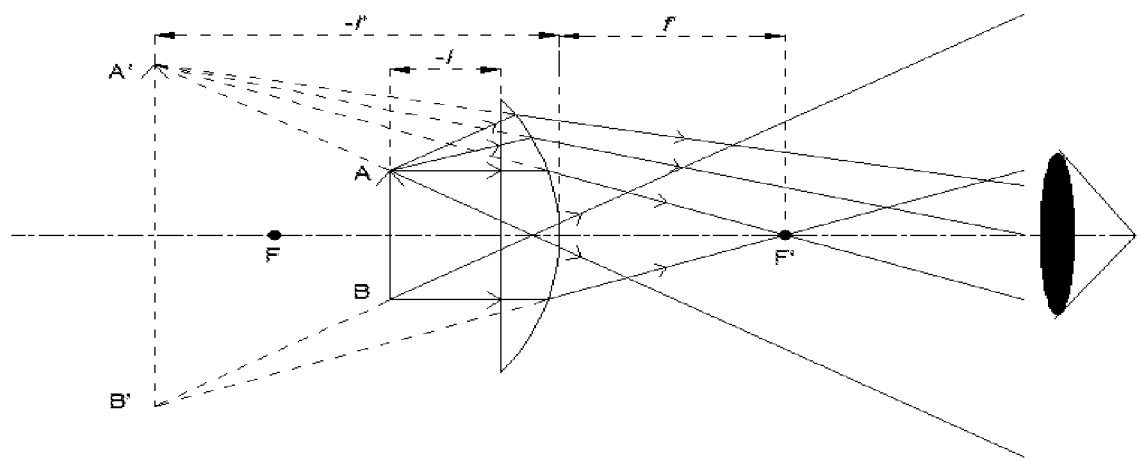
FIG. 2 is a display principle diagram of forming an enlarged virtual image by a positive lens.
Figure 3:
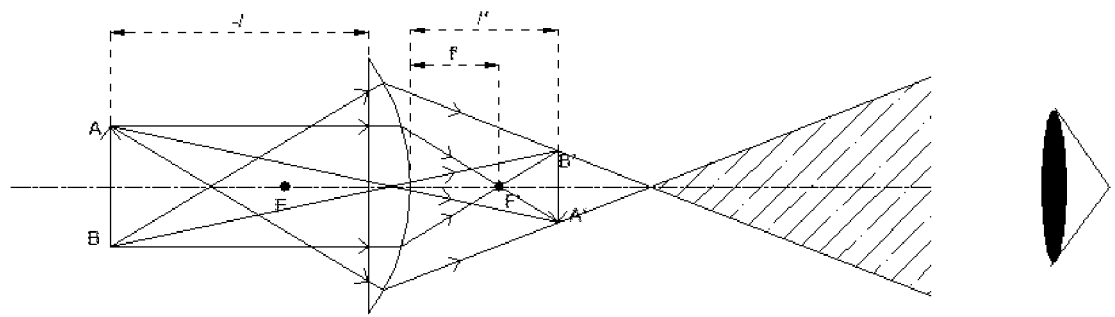
FIG. 3 is a display principle diagram of forming an real image by a positive lens.

FIGS. 2 and 3 illustrate imaging principles when light travels through a positive lens.

FIG. 2 illustrates a display principle diagram of forming an image by a positive lens behind the lens. As shown in FIG. 2, an object AB is placed behind the lens (the left side in FIG. 2), such that the object distance l is smaller than the focal length f of the lens. Then, a virtual image A'B' may be formed behind the lens (the left side in FIG. 2) for the object AB, and captured by human eyes.

FIG. 3 illustrates a display principle diagram of forming an image by a positive lens in front of the lens. As shown in FIG. 3, an object AB is placed behind the lens (the left side in FIG. 3), such that the object distance l is larger than the focal length f of the lens. Then, an inverted image B'A' may be formed in front of the lens (the right side in FIG. 3) for the object AB.

Figure 4:
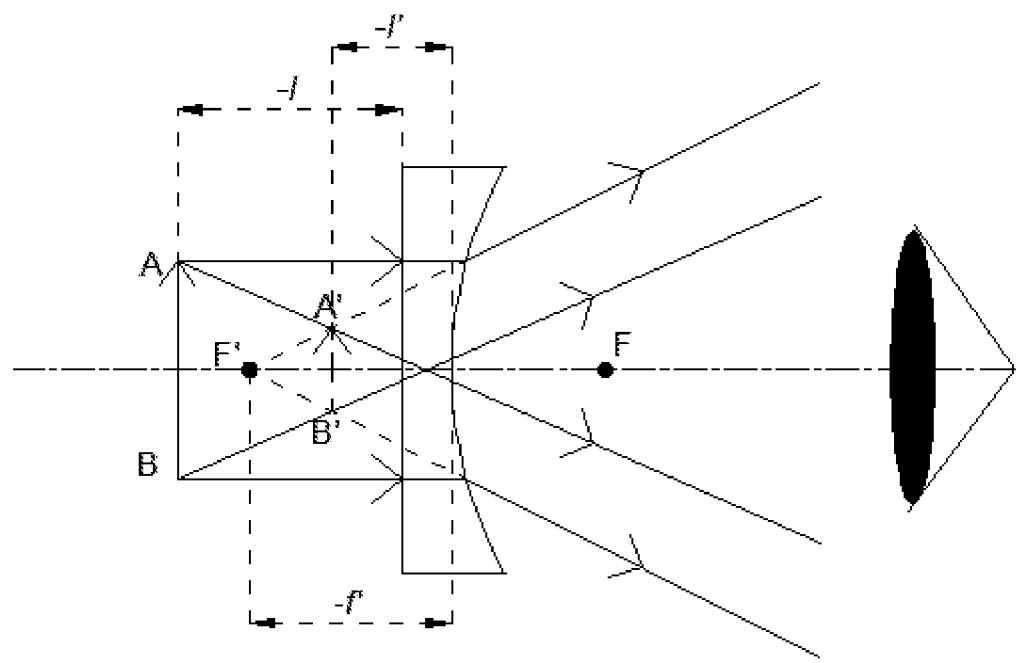
FIG. 4 is a display principle diagram of forming a reduced virtual image by a negative lens.

FIG. 4 is a display principle diagram of forming an image by a negative lens between an object and a lens. An object AB is placed behind the lens (the left side in FIG. 4). Then, an image A'B' may be formed between the lens and the object.

In FIGS. 2 to 4, F denotes a focus of the lens at the object side, and F' denotes a focus of the lens at the image side.

A formula (1) represents a relationship between the object and the image for the lens. It may be seen from the formula (1) that, when the focal length f' of the lens and a distance l between the object and the lens are determined, the distance l' between the object image and the lens may be obtained.

$$\frac{1}{l'} - \frac{1}{l} = \frac{1}{f'} \quad (1)$$

where, l denotes a distance between the object and the lens;

l' denotes a distance between the object image and the lens; and f' denotes a focal length of the lens.

In the display device provided by the present disclosure, the image displayed on the display panel 200 is the "object" described above. A plurality of equivalent lenses may be formed with the auxiliary panel 100. Specifically, each second transparent electrode column corresponds to a column of equivalent lenses (may be one equivalent lens or a plurality of equivalent lenses). The distance between the display panel 200 and the auxiliary panel 100 is fixed. That is, l is constant in the formula (1). When designing the display device, the designer may determine the distance between the image and the light emitting surface generated by each equivalent lens formed by the second transparent electrode column, as long as it may ensure that all of the equivalent lenses formed by the second transparent electrode column form images on the same curved surface. Accordingly, it may be deemed that the distance l' between the object image and the equivalent lens is known, and the focal length f of the equivalent lens may be resolved with the formula (1).

Figure 5:
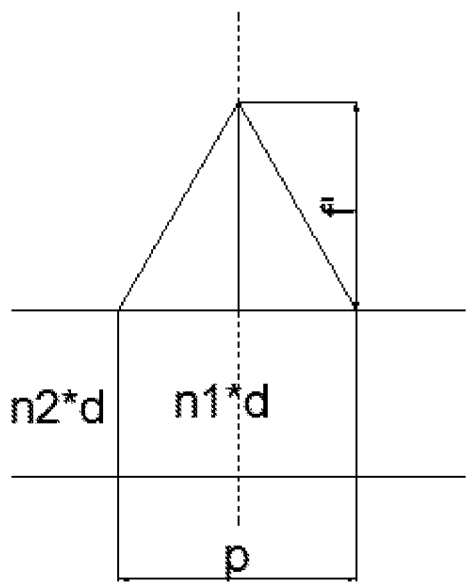
FIG. 5 is an equivalent optical path diagram of an equivalent lens formed in an auxiliary panel.

FIG. 5 is an equivalent optical path diagram of an equivalent convex lens formed in the auxiliary panel. According to the principle of the optical path principle formula (2), refractive indices of respective parts of the equivalent lens may be obtained. Therefore, it only requires the controller to apply a signal to the first transparent electrode layer and the second transparent electrode column, to cause the liquid crystals corresponding to the second transparent electrode column to have respective refractive indices.

$$n_1 d + f' = n_2 d + \sqrt{f'^2 + (p/2)^2} \quad (2)$$

where, f' denotes a focal length of the equivalent lens;

$n_1$ denotes a refractive index at the central part of the equivalent lens;

$n_2$ denotes a refractive index at an edge of the equivalent lens;

d denotes a distance between the display panel and the auxiliary panel; and p denotes a width of the second electrode column.

Since $[(n_1-n_2)*d]^2 \approx 0$, the above formula (2) may be reduced to the following formula (3):

$$f' = \frac{p^2}{8(n_1 - n_2)d} \quad (3)$$

where, $n_o \leq n_2 \leq n_1 \leq n_e$. $n_o$ denotes a refractive index of light o for the liquid crystal having double refractive indices. $n_e$ denotes a refractive index of light e for the liquid crystal having double refractive indices.

The principle of calculating the focal length of the concave lens with the equivalent path principle is similar to that of the convex lens, which will not be repeated herein.

In one or more embodiments of the present disclosure, by controlling refractive indices of different regions of the first liquid crystal layer, it may change the light emitting direction of the display device, and form an image on a curved surface. That is, the display device may achieve display on a curved surface, and the viewer may see a picture displayed on the curved surface in front of the display device.

In one or more embodiments of the present disclosure, the display surface of the display device is not provided as a curved surface. Therefore, the installation space of the display device is not increased. That is, the display device may be installed in relatively small space.

In one implementation of the present disclosure, the controller does not provide a control signal to the first transparent electrode layer 112 and the second transparent electrode layer 122, and the refractive index is the same for all the regions of the first liquid crystal layer 130, such that the display device may achieve a flat display. The user may decide whether the display device is used to perform curved surface display as desired. As shown in FIG. 6, when no signal is applied to the first transparent electrode layer 112 and the second transparent electrode layer 122, the deflection direction of the liquid crystal molecules in the first liquid crystal is the same. Therefore, the refractive index is the same for all the regions of the first liquid crystal layer, such that light may be directly transmitted without deflecting the optical path, so as to achieve a flat display.

Moreover, in the present disclosure, the initial arrangement direction of the liquid crystal molecules (that is, the direction of the major axes of the liquid crystal molecules when a voltage is not applied) in the first liquid crystal layer is determined by the display panel.

In the present disclosure, the specific structure of the display panel 200 is not particularly limited. For example, as shown in FIG. 1, the display panel 200 is a liquid crystal panel, and when the display panel is a liquid crystal panel, the display device may also include a back light source 300.

When the display panel 200 is a liquid crystal panel, the display panel 200 includes a first polarizer and a second polarizer. The first polarizer is disposed at the light incident side of the display panel, and the second polarizer is disposed at the light emitting side of the display panel. The initial arrangement direction of the first liquid crystal layer of the auxiliary panel is parallel to the polarizing direction of the second polarizer.

Figure 24A:
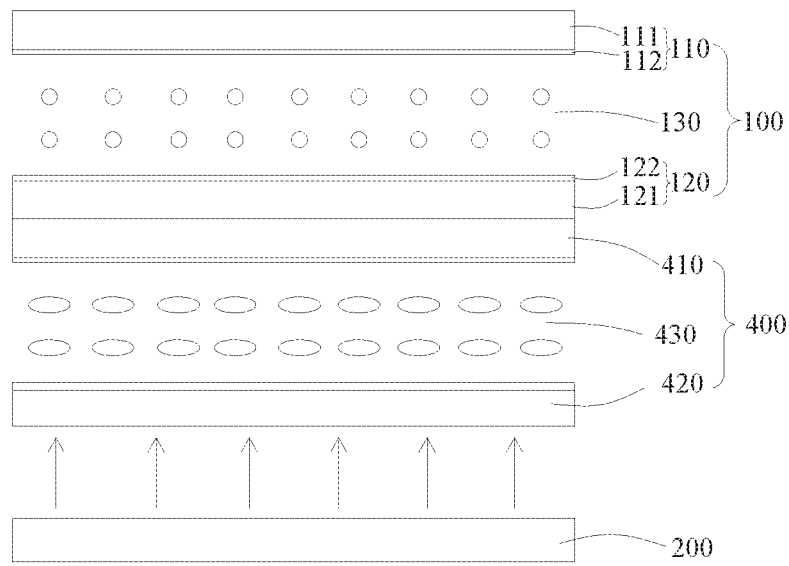
FIG. 24A is a schematic diagram illustrating an embodiment of the display device when the display panel is an organic light emitting diode display panel.
Figure 24B:
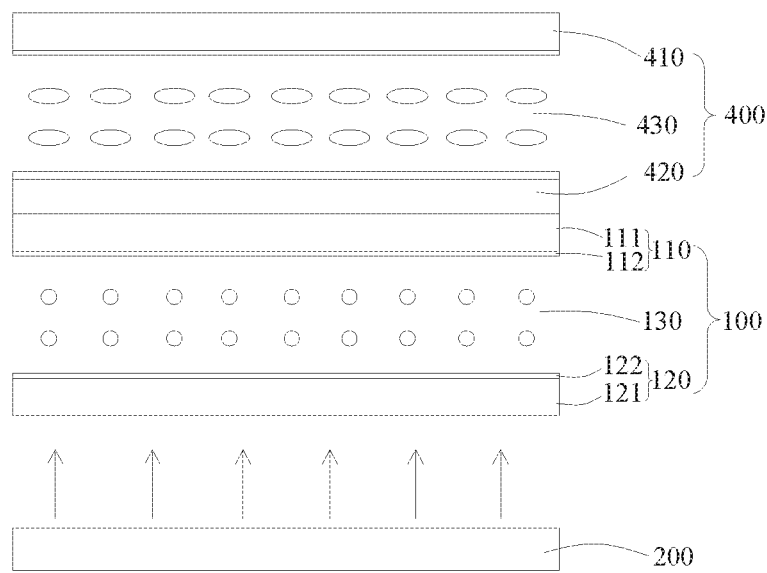
FIG. 24B is a schematic diagram illustrating another embodiment of the display device when the display panel is an organic light emitting diode display panel.

Of course, the display panel 200 may also be an organic light emitting diode display panel. When the display panel 200 is an organic light emitting diode display panel, as shown in FIGS. 24A and 24B, the display device also includes an adjustment panel 400 disposed on the light emitting side of the display panel 200 and is stacked with the auxiliary panel. The adjustment panel 400 includes a third substrate 410 and a fourth substrate 420 disposed opposite to each other to form a cell, and a second liquid crystal layer 430 encapsulated between the third substrate 410 and the fourth substrate 420. The initial arrangement direction of the second liquid crystal layer 430 is perpendicular to the initial arrangement direction of the liquid crystal layer 130. The third substrate includes a third base substrate and a third transparent electrode layer. The fourth substrate includes a fourth base substrate and a fourth transparent electrode layer. The third transparent electrode layer is disposed on the third base substrate in a manner similar to that of the first transparent electrode layer on the first base substrate. The fourth transparent electrode layer is disposed on the fourth base substrate in the same manner as the second transparent electrode layer on the second base substrate. The controller is capable of providing to the adjustment panel with the same signal as that to the auxiliary panel.

The arrangement of the adjustment panel 400 includes two modes. One mode is arranging the adjustment panel 400 between the display panel 200 and the auxiliary panel 100 (as shown in FIG. 24A). The other is arranging the adjustment panel 400 at the light emitting side of the auxiliary panel 100 (as shown in FIG. 24B).

Hereinafter, the display principle of the display device as shown in FIG. 24A will be described in detail.

The polarized light emitted by the display panel 200 may be decomposed into a component parallel to the paper and a component perpendicular to the paper. When the display is performed, a control signal is applied to the adjustment panel 400, and the adjustment panel 400 may process the polarized light having the polarizing direction parallel to the paper. At this time, the refraction of the polarized light having the polarizing direction parallel to the paper is modified, to change the light emitting direction thereof. However, the refractive index of the polarized light having the polarizing direction perpendicular to the paper is not changed, and the polarized light having the polarizing direction perpendicular to the paper transmits directly through the adjustment panel 400. At the same time, a control signal is applied to the auxiliary panel 100, and the auxiliary panel 100 processes refraction of the polarized light having the polarizing direction perpendicular to the paper, which directly transmits through the adjustment panel 400, to change the light emitting direction thereof. While the polarized light having the polarizing direction parallel to the paper, whose refraction has been modified by the adjustment panel 400, directly transmits through the auxiliary panel 100.

After being processed by the auxiliary panel 100 and the adjustment panel 400, the polarized light having the polarizing direction parallel to the paper and the polarized light having the polarizing direction perpendicular to the paper have the same light emitting direction. Therefore, an image displayed on a curved surface may be obtained. In other words, the auxiliary panel 100 may guide the light having the polarizing direction perpendicular to the paper to the curved surface, and the adjustment panel 400 may guide the light having the polarizing direction parallel to the paper to the curved surface.

It should be noted that the above is for convenience of description only and not for limitation. It is also possible to configure the auxiliary panel 100 to guide the light having the polarizing direction parallel to the paper to the curved surface, and configure the adjustment panel 400 to guide the light having the polarizing direction perpendicular to the paper to the curved surface.

The controller may simultaneously control the auxiliary panel 100 and the adjustment panel 400 such that the first liquid crystal layer forms a plurality of equivalent lenses and the second liquid crystal layer forms a plurality of equivalent lenses, and the equivalent lenses formed by the first liquid crystal layer are opposite to the equivalent lenses formed by the second liquid crystal layer one by one, with the parameters (including focal length, refractive index, etc.) of the equivalent lenses formed by the first liquid crystal layer being the same with the parameters of the equivalent lenses formed by the second liquid crystal layer.

The operation of the display device shown in FIG. 24B is similar to that of the display device shown in FIG. 24A and will not be repeated herein.

The display panel 200 includes a plurality of pixel units arranged in multiple rows and multiple columns. Each pixel unit includes a plurality of sub-pixels.

In one implementation of the present disclosure, the first transparent electrode layer 112 is a planar electrode covering the first base substrate 111, and the second transparent electrode layer 122 includes a plurality of second transparent electrode columns, wherein each column of pixel units is corresponding to at least one of the second transparent electrode columns. The controller is configured to be capable of providing a control signal to the first transparent electrode layer and the second transparent electrode columns to cause the refractive index of any portion of the first liquid crystal layer corresponding to one of second transparent electrode columns to gradually increase from either side of the second transparent electrode column in the width direction to the middle of the second transparent electrode column, to form an equivalent positive lens, and to cause the focal lengths of the equivalent lenses formed by the respective portions of the first liquid crystal layer to gradually decrease from either side of the auxiliary panel to the middle of the auxiliary panel in the width direction of the auxiliary panel.

For convenience of the description, the first liquid crystal layer may be divided into a plurality of portions, with each of the second transparent electrode columns corresponding to one of the portions of the first liquid crystal layer. The portions of the first liquid crystal layer have uniform thickness, and the refractive indices through the portions of the first liquid crystal layer may be changed by changing the refractive indices of the portions of the first liquid crystal layer.

Figure 7A:
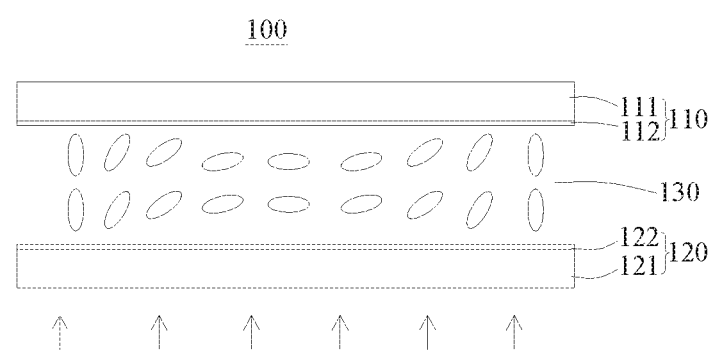
FIG. 7A is a diagram illustrating arrangement of liquid crystal molecules when the auxiliary panel is applied with a voltage, the auxiliary panel applied with a voltage being equivalent to a positive lens.
Figure 7B:
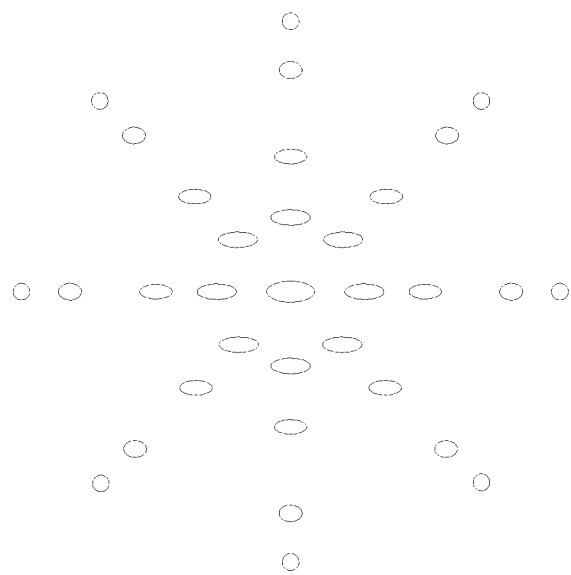
FIG. 7B is a top view of FIG. 7A.

FIGS. 7A and 7B illustrate deflection of the liquid crystal molecules in the portions of the first liquid crystal layer corresponding to the second transparent electrode column. As shown in FIG. 7A, the left-right direction is the width direction of the second transparent electrode column. The direction of the major axis of each of the liquid crystal molecules at either side of the second transparent electrode column in the width direction is vertical, and the direction of the major axis of each of the liquid crystal molecules at the middle of the second transparent electrode column in the width direction is horizontal.

By setting the magnitude of the voltage applied to each of the second transparent electrode columns, it is possible to control the focal length of the equivalent positive lens formed by the portions of the first liquid crystal layers corresponding to the second transparent electrode columns, so that a corresponding image may be displayed at different positions, finally resulting in a curved surface display.

In the embodiments as shown in FIGS. 9 to 12, an enlarged image may be formed behind the display panel. In the embodiments as shown in FIGS. 13 to 16, an enlarged image may be formed in front of the display panel. In the embodiments as shown in FIGS. 18 to 21, a part of the formed image is located in front of the display panel, and a part is located behind the display panel. It should be noted that, "front" and "behind" herein refer to "upper" and "lower" direction in the drawings.

Hereinafter, the embodiments described in the above figures will be described in detail. In FIGS. 9 to 23, the corresponding $f_1$, $f_2$, and $f_3$ on the equivalent lens are the focal lengths of the equivalent lens. It should be noted that $f_1 < f_2 < f_3$.

Figure 9:
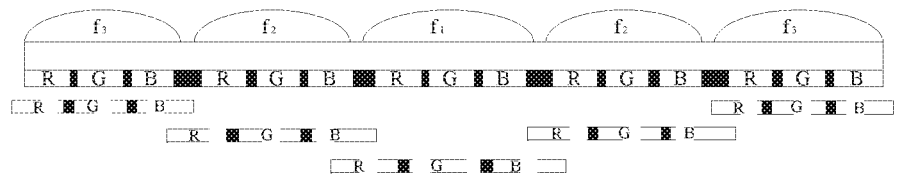
FIG. 9 is a schematic diagram illustrating a positive lens forming a rear image.

As shown in FIG. 9, in the display panel, each pixel unit corresponds to three sub-pixels, each of which are a red sub-pixel R, a green sub-pixel G, and a blue sub-pixel B, respectively, wherein each column of pixel units is corresponding to one of the second transparent electrode columns.

The positions of the images formed by the plurality of equivalent positive lenses may be controlled by controlling the relationship between the distance from the display panel to the auxiliary panel and the focal lengths of the equivalent positive lenses.

In order to cause the array of the equivalent lenses formed on the auxiliary panel to be positioned behind the display panel (on the lower side in FIGS. 9 to 12), the control signal provided by the controller causes the focal lengths of the equivalent positive lenses formed by the first liquid layer corresponding to respective second transparent electrode columns on the auxiliary panel to be larger than the distance between the display panel and the auxiliary panel (i.e., the object distance), and causes the focal lengths of the equivalent positive lenses formed by the first liquid layer correspondingly to gradually decrease from either side to the middle of the auxiliary panel in the width direction of the auxiliary panel.

In FIG. 9, the portions of the first liquid crystal layer corresponding to the respective second transparent electrode columns are equivalent to positive lenses. In FIG. 9, only five of the equivalent lenses are shown, an image formed by the equivalent lenses may be seen at the human eyes. In FIG. 9, the dashed box shows the object image formed by the pixel units. The object images formed by all of the pixel units are located on the same curved surface. Moreover, the opening of the curved surface faces the viewer (that is, faced upward in FIG. 9).

It should be understood that, by utilizing the first transparent electrode layer, the second transparent electrode layer and the controller, when the first liquid crystal layer forms the plurality of equivalent positive lenses, the size of the image formed by the equivalent positive lenses may be controlled according to the relationship between the object distance and the focal length.

Figure 10:
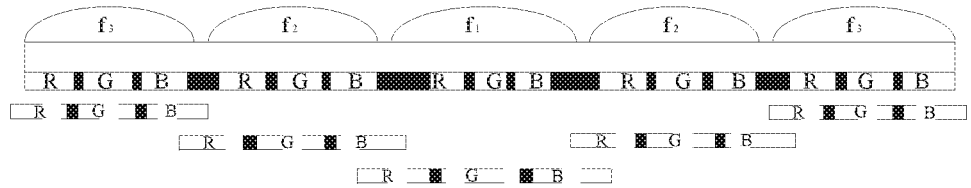
FIG. 10 is a schematic diagram illustrating a positive lens forming a rear image, with the aperture ratio of the display device gradually decreasing from the middle to either side.

In order to prevent an overlap between the images displayed by the respective pixels, in one embodiment, as shown in FIG. 10, each column of pixel units corresponds to one second transparent electrode column, and the aperture ratio of the display panel gradually increases from the middle of the display panel to either side of the auxiliary panel. The aperture ratio of the pixel unit is determined by the width of the black matrix surrounding the pixel unit. Therefore, the width of the black matrix surrounding the middle pixel unit is the largest, and the width of the black matrix surrounding the edge pixel unit is the smallest. The black matrix may block the overlapping portions between the virtual images formed by adjacent two pixel units, so that a better display effect may be obtained.

In another implementation of the present disclosure, the display device may be arranged such that each column of sub-pixels corresponds to at least one of the second transparent electrode columns and the controller is configured to be capable of providing the same signal to the plurality of second transparent electrode columns corresponding to the same column of pixel units.

Figure 11:
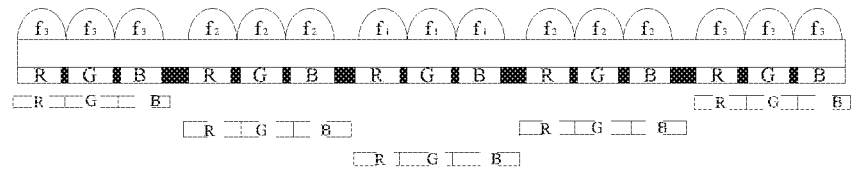
FIG. 11 is a schematic diagram illustrating a positive lens forming a rear image, wherein each column of sub-pixels is corresponding to one column of second transparent electrodes, and the focal lengths of the same pixel unit are the same.

Similar to those described above, in FIG. 11, equivalent positive lenses of the first liquid crystal layer corresponding to the second transparent electrode column are shown. In an implementation as shown in FIG. 11, during display, each sub-pixel corresponds to an equivalent positive lens, or a sub-pixel corresponds to a plurality of equivalent positive lenses. Moreover, focal lengths of the lenses corresponding to the same sub-pixel are the same, and focal lengths of the lenses corresponding to different sub-pixels are different. Although not shown, it should be noted that, sub-pixels in each pixel unit may be overlapped during display. Overlapping between sub-pixel images will not affect the display, but also may be desirable for the modulation of the color of the picture, and indirectly improve the aperture ratio of the pixel unit. Images of adjacent pixels will be not overlapped or will be overlapped a little. It should be understood that, since a black matrix is provided between the adjacent pixel units, even if the images formed by the adjacent pixel units are overlapped, they are obscured by the black matrix. Therefore, when the image is displayed by the display device as shown in FIG. 11, a better color effect may be obtained.

In another implementation of the present disclosure, the display device may be arranged such that each column of sub-pixels corresponds to one second transparent electrode column and the controller is configured to be capable of providing a control signal to the first transparent electrode layer and the respective second transparent electrode columns, to cause the focal lengths of the equivalent positive lenses formed by the portions of the first liquid crystal layer corresponding to the columns of sub-pixel units on one side of the auxiliary panel to be different from one another, and the focal lengths of the equivalent positive lenses formed by the portions of the first liquid crystal layer corresponding to the columns of sub-pixel units on the auxiliary panel to be symmetrically distributed with respect to the center line in the width direction of the auxiliary panel.

Figure 12:
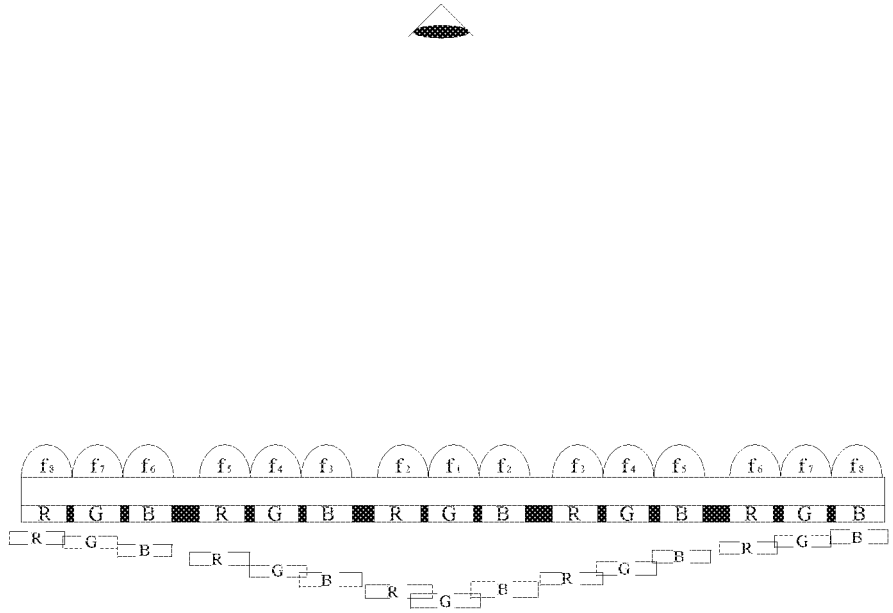
FIG. 12 is a schematic diagram illustrating a positive lens forming a rear image, wherein each column of sub-pixels is corresponding to one of second transparent electrode columns, and the focal lengths of the same pixel unit are different from one another.

Similar to those described above, in FIG. 12, equivalent lenses formed by the first liquid crystal layer corresponding to the second transparent electrode column are shown. In an implementation as shown in FIG. 12, each sub-pixel corresponds to one equivalent lens during display. Thus, sub-pixels in each pixel unit may overlap, which may be desirable for color modulation. Virtual images formed by adjacent two pixel units are not overlapped or overlapped a little. When the virtual images formed by adjacent two pixel units overlap, the overlapping portions may be blocked by the black matrix so as not to affect the displayed image.

As described above, the virtual image formed by the auxiliary panel is located behind the display panel.

When the controller is arranged such that the control signal provided by the controller causes the focal lengths of the first liquid crystal layer corresponding to the respective second transparent electrode columns on the auxiliary panel to be smaller than the distance between the display panel and the auxiliary panel (i.e., the object distance). In this case, by applying signal to the first transparent electrode layer and the respective second transparent electrode columns in the second transparent electrode layer, the first liquid crystal layer may form an array of equivalent positive lenses.

As shown in FIGS. 13 to 16, since focal length of the equivalent positive lens is smaller than the distance between the display panel and the auxiliary panel, it may form an image in front of the display device (i.e. on the upper side in FIGS. 13 to 16).

Figure 13:
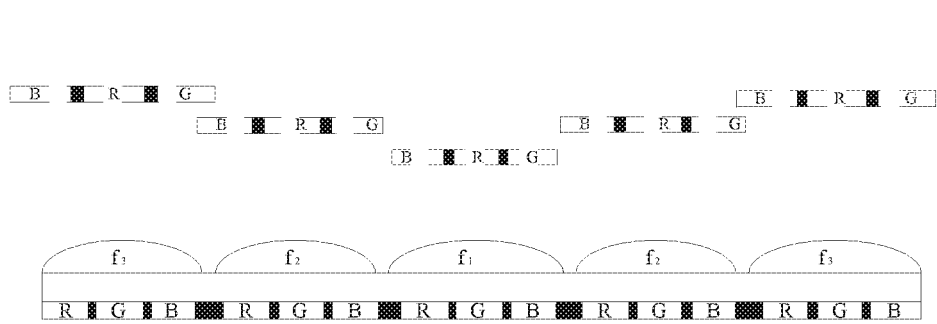
FIG. 13 is a schematic diagram illustrating a positive lens forming a front image.
Figure 14:
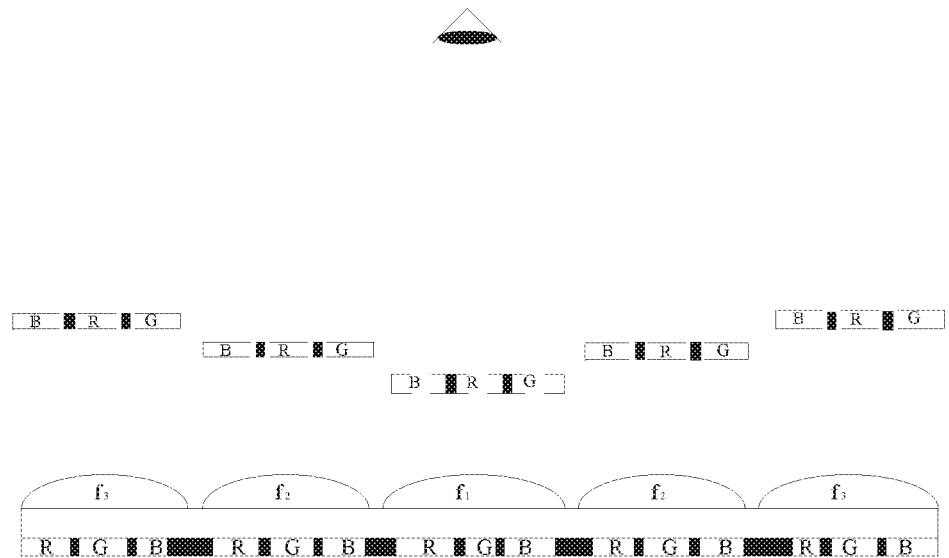
FIG. 14 is a schematic diagram illustrating a positive lens forming a front image, wherein the aperture ratio of the display device gradually decreases from the middle to either side.

In an implementation as shown in FIGS. 13 and 14, each column of pixel units corresponds to the same column of second transparent electrode. As shown in the figures, the equivalent positive lens formed on the auxiliary panel may form an inverted image in front of the display panel. That is, in the same pixel unit, the positions of the sub-pixels change. However, it should be understood by those skilled in the art that the light emitted by a plurality of sub-pixels in the same pixel unit may be mixed with one another so that the pixel unit may display a predetermined color, and the change in the positions of the sub-pixels in the same pixel unit does not affect the color finally presented.

As described above, the problem that during the curved-surface display of the display device the image displayed by the pixel units may be overlapped may be solved through the following implementations.

As shown in FIG. 14, each column of pixel units corresponds to one second transparent electrode column, and the aperture ratio of the display panel gradually decreases from the middle of the display panel to either side of the auxiliary panel. The aperture ratio of the pixel unit is determined by the width of the black matrix surrounding the pixel unit. Therefore, the width of the black matrix surrounding the middle pixel unit is the smallest, and the width of the black matrix surrounding the edge pixel unit is the largest. The black matrix may block the overlapping part between the virtual images formed by adjacent two pixel units, so that a better display effect may be obtained.

Figure 15:
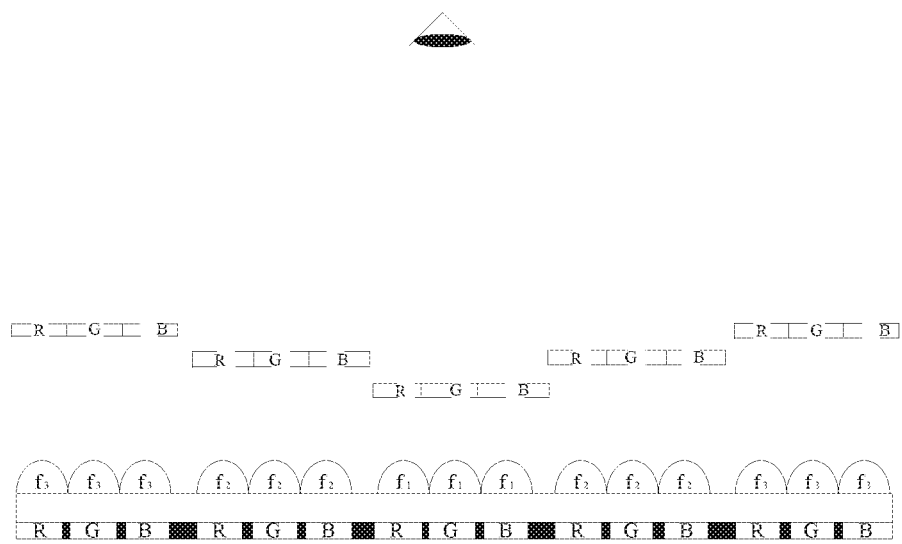
FIG. 15 is a schematic diagram illustrating a positive lens forming a front image, wherein each column of sub-pixels is corresponding to one column of second transparent electrodes, and the focal lengths of the same pixel unit are the same.

As shown in FIG. 15, during display, each sub-pixel corresponds to one equivalent positive lens, or a sub-pixel corresponds to a plurality of equivalent positive lenses. Moreover, focal lengths of the equivalent positive lenses corresponding to the same sub-pixel are the same, and focal lengths of the equivalent positive lenses corresponding to different sub-pixel are different. Although not shown, it should be noted that, sub-pixels in each pixel unit may be overlapped during display. Overlapping between sub-pixel images will not affect the display, but also may be desirable for the modulation of the color of the picture, and indirectly improve the aperture ratio of the pixel unit. Images of adjacent pixels will be not overlapped or will be overlapped a little. It should be understood that, since a black matrix is provided between the adjacent pixel units, even if the images formed by the adjacent pixel units are overlapped, they are obscured by the black matrix. Therefore, when the image is displayed by the display device as shown in FIG. 15, a better color effect may be obtained.

Figure 16:
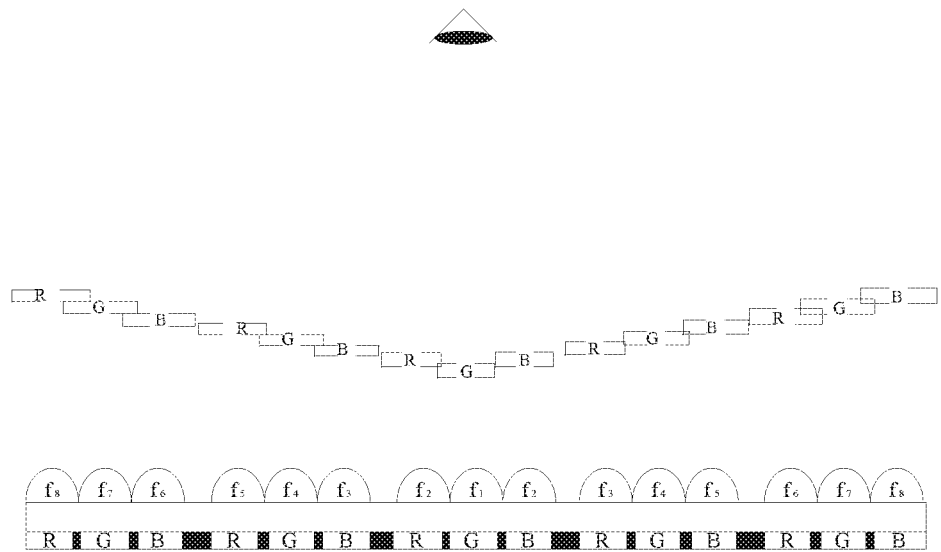
FIG. 16 is a schematic diagram illustrating a positive lens forming a front image, wherein each column of sub-pixels is corresponding to one column of second transparent electrodes, and the focal lengths of the same pixel unit are different from one another.

As shown in FIG. 16, each sub-pixel corresponds to one equivalent lens during display. Thus, sub-pixels in each pixel unit may be overlapped, which may be desirable for color modulation. Virtual images formed by adjacent two pixel units are not overlapped or overlapped a little. When the virtual images formed by adjacent two pixel units are overlapped, the overlapped portions may be blocked by the black matrix so as to not affect the displayed image.

Figure 18:
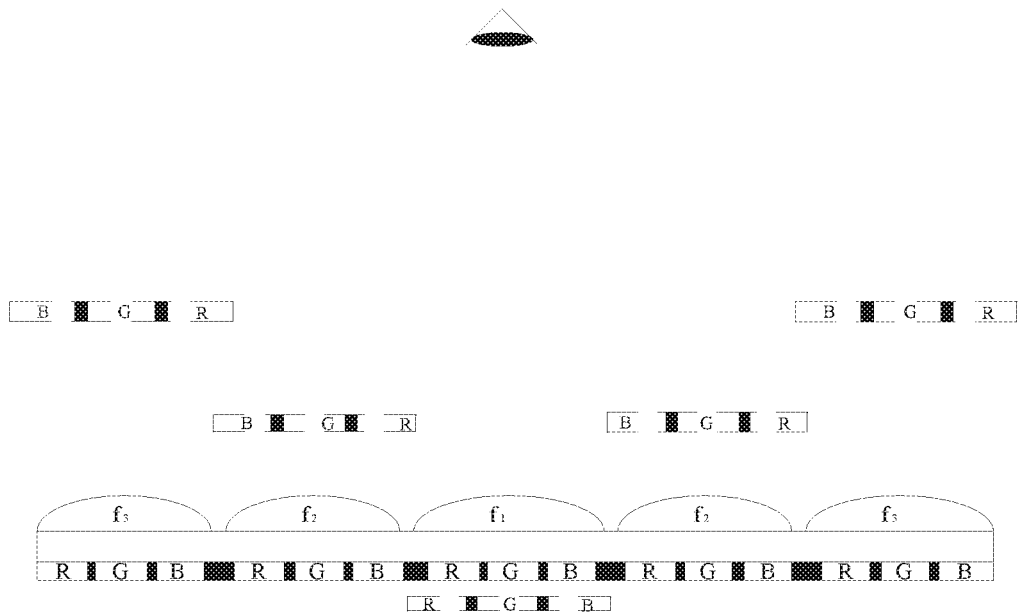
FIG. 18 is a schematic diagram illustrating a positive lens forming images on both sides of the display panel.

Of course, the image formed by the display device may be located in front of and behind the display device by means of a control signal, with part of the images located in front of the display device (i.e., on the upper side of FIG. 18) and part of the images behind the display device (i.e., on the lower side of FIG. 18). Specifically, the auxiliary panel may be divided into three parts along the width direction of the auxiliary panel. The control signal provided by the controller may cause focal length of the equivalent positive lenses corresponding to the portions of the first liquid crystal layer on either side of the auxiliary panel to be smaller than the distance between the display panel and the auxiliary panel, and cause the focal length of the equivalent positive lenses corresponding to the portions of the first liquid crystal layer in the middle of the auxiliary panel to be larger than the distance between the display panel and the auxiliary panel. It can be seen from FIG. 18 that the equivalent positive lenses on either side of the display panel in the width direction may form an inverted image in front of the display panel, and the equivalent positive lenses located in the middle of the display panel in the width direction may form a positive image behind the display panel.

In one embodiment of the present disclosure, in order to obtain a better display effect, the three parts of the auxiliary panel are symmetrical with respect to the center line in the width direction of the auxiliary panel.

In one embodiment, the size of the portions on either side of the auxiliary panel is larger than the size of middle portion of the display device. The equivalent positive lens formed by the portion in the first liquid crystal layer corresponding to either side of the auxiliary panel may cause the image displayed by the display panel to form an image in front of the display device. The equivalent positive lens formed by the portion in the first liquid crystal layer corresponding to the middle of the auxiliary panel may cause the image displayed by the display panel to form an image behind the display device.

Figure 19:
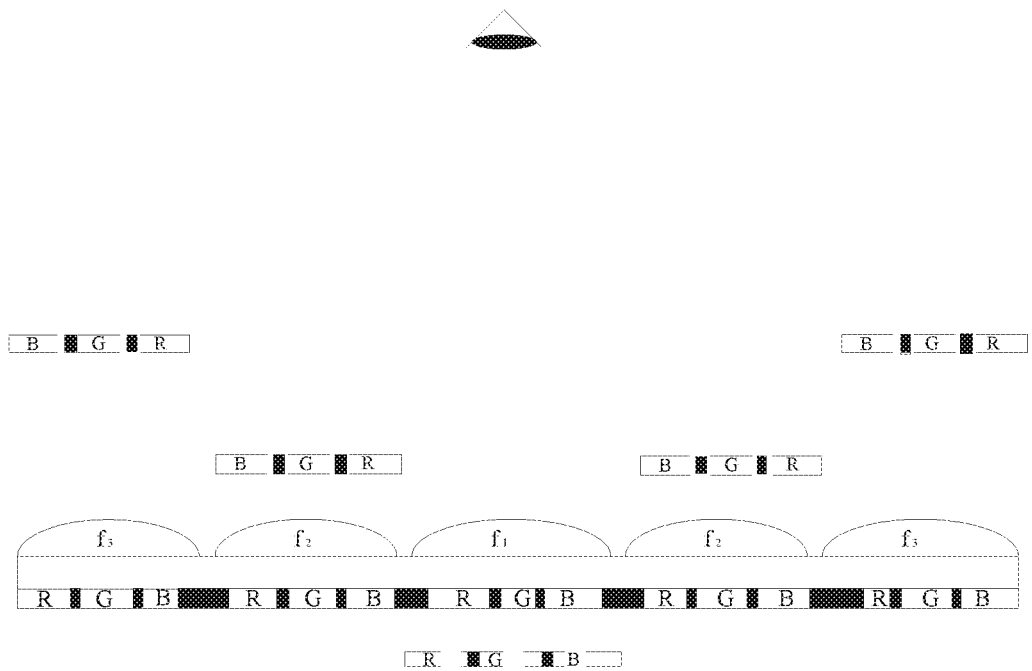
FIG. 19 is a schematic diagram illustrating a positive lens forming images on both sides of the display panel, wherein the aperture ratio of the display device gradually decreases from the middle to either side.

In order to reduce the overlapping of the image formed by the pixel units, in an embodiment, as shown in FIG. 19, for the portion of the display panel corresponding to two lateral portions of the auxiliary panel, from the middle of the width direction of the display panel to either side of the width direction of the display panel, the aperture ratio of the display panel gradually decreases. For the portion of the display panel corresponding to middle portion of the auxiliary panel, from the middle of the width direction of the display panel to either side of the width direction of the display panel, the aperture ratio of the display panel gradually increases.

Figure 20:
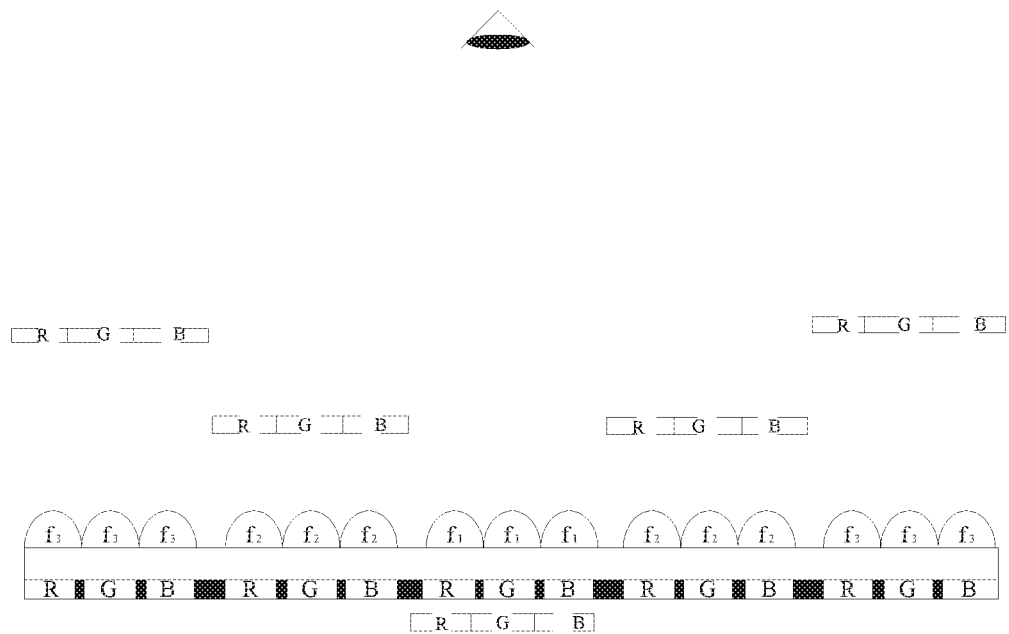
FIG. 20 is a schematic diagram illustrating a positive lens forming images on both sides of the display panel, wherein each column of sub-pixels is corresponding to one column of second transparent electrodes, and the focal lengths of the same pixel unit are the same.
Figure 21:
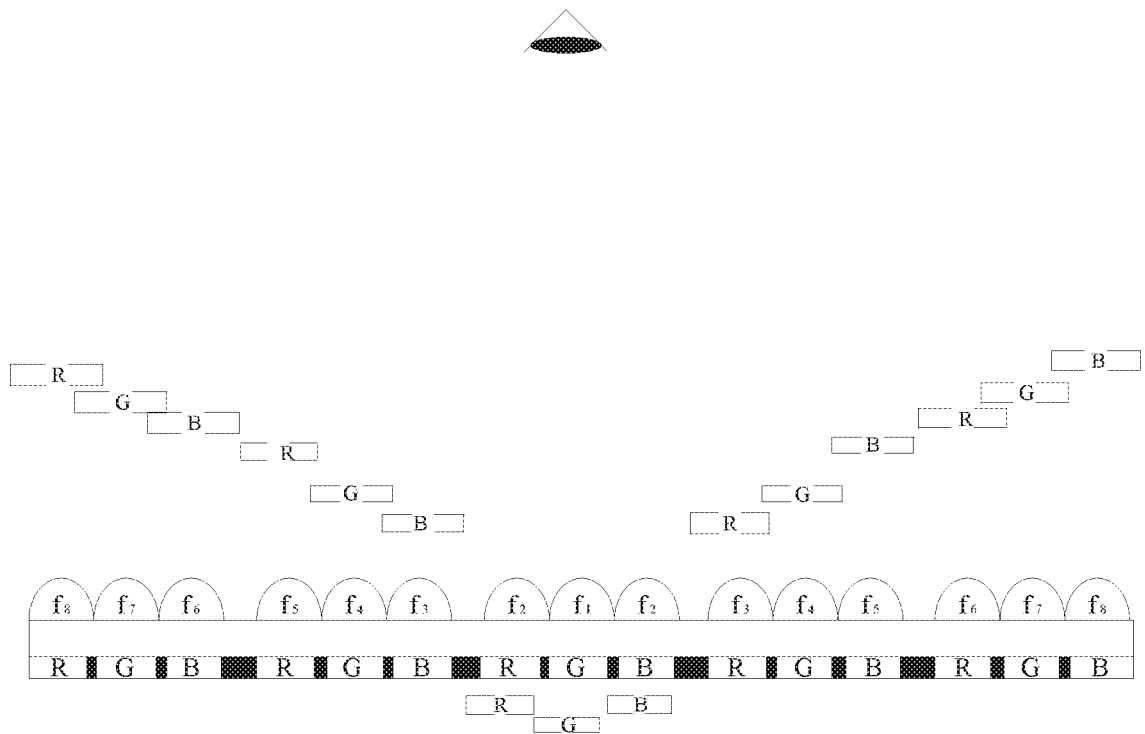
FIG. 21 is a schematic diagram illustrating a positive lens forming images on both sides of the display panel, wherein each column of sub-pixels is corresponding to one column of second transparent electrodes, and the focal lengths of the same pixel unit are different from one another.

Similarly, an equivalent lens may be provided in accordance with the embodiment of FIG. 20 to reduce the overlapping between the images formed by the pixel units. Specifically, each column of sub-pixels corresponds to one second transparent electrode column, and the focal lengths of the equivalent positive lenses formed by the second transparent electrode columns corresponding to different sub-pixels in the same pixel unit are the same.

The control signal causing equivalent positive lenses to be formed in the first liquid crystal layer of the auxiliary panel has been described above. Hereinafter, the control signal causing equivalent negative lenses to be formed in the first liquid crystal layer of the auxiliary panel will be described.

The controller is configured to be capable of providing a control signal to the first transparent electrode layer and the respective second transparent electrode columns, to cause the refractive index of a portion of the first liquid crystal layer corresponding to the respective second transparent electrode column to gradually decrease from either side of the width direction of the second transparent electrode column to the middle of the second transparent electrode column to form an equivalent negative lens, and cause the focal lengths of the equivalent negative lenses formed by the portions of the first liquid crystal layer to gradually increase from either side to the middle of the auxiliary panel in the width direction of the auxiliary panel.

Figure 8A:
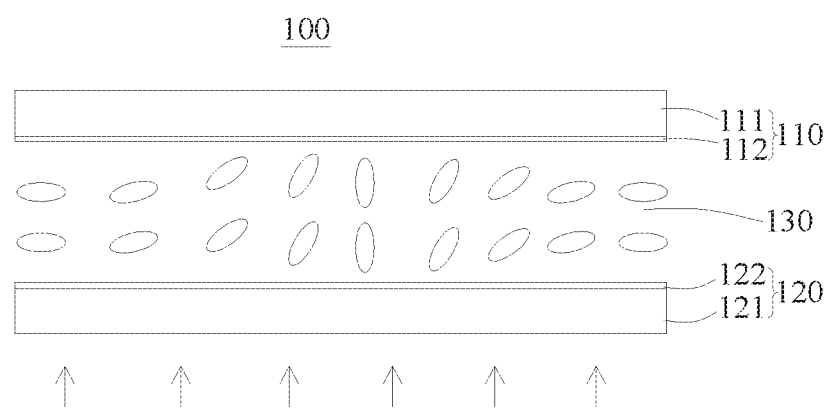
FIG. 8A is a diagram illustrating arrangement of liquid crystal molecules when the auxiliary panel is applied with a voltage, the auxiliary panel applied with a voltage being equivalent to a negative lens.
Figure 8B:
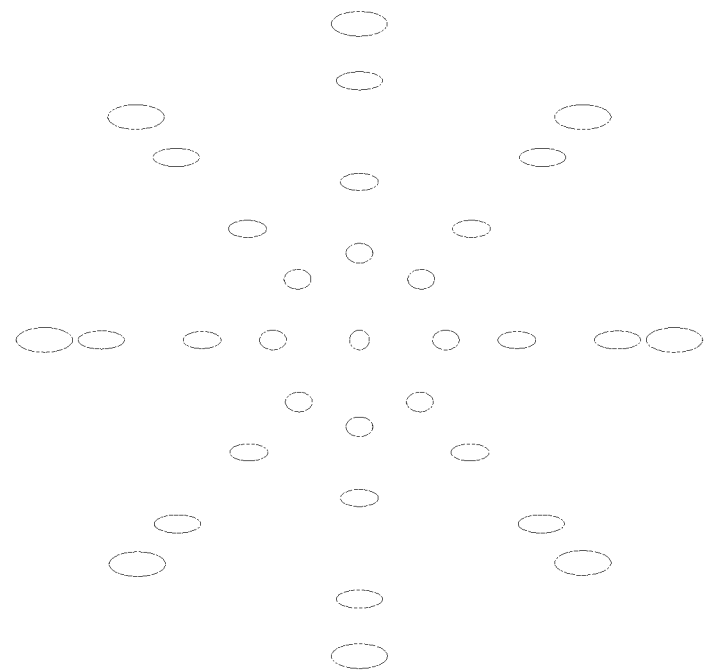
FIG. 8B is a top view of FIG. 8A.
Figure 8B:

FIGS. 8A and 8B illustrate deflection of liquid crystal molecules corresponding to one second transparent electrode column. In FIG. 8A, the left-right direction is the width direction of the second transparent electrode column. The liquid crystal molecules on either side of the width direction of the second transparent electrode column have major axes in the horizontal direction, and the liquid crystal molecules in the middle of the width direction of the second transparent electrode column have major axes in the vertical direction.

By setting the magnitude of the voltage applied to each of the second transparent electrode columns, it is possible to control the focal lengths of the equivalent negative lenses formed by the portions of the first liquid crystal layer corresponding to different second transparent electrode columns, so as to display corresponding images at different positions to finally form a curved surface display.

Figure 17:
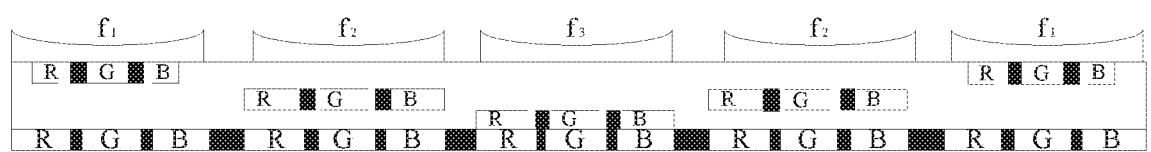
FIG. 17 is a principle diagram illustrating a negative lens forming a reduced virtual image, wherein the virtual curved surface is between the liquid crystal lens and the pixel.

As shown in FIG. 17, when light passes through the equivalent negative lens, a reduced image may be formed between the equivalent negative lens and the display panel.

In one implementation, the auxiliary panel is divided into three parts in the width direction. The display panel includes a plurality of pixel units arranged in a plurality of rows and columns. The first transparent electrode layer is a planar electrode covering the first base substrate. The second transparent electrode layer includes a plurality of second transparent electrode columns. Each column of pixel units corresponds to at least one second transparent electrode column. The controller is configured to be capable of providing a control signal to the first transparent electrode layer and the respective second transparent electrode columns, to cause the refractive index of a portion of the first liquid crystal layer corresponding to the respective second transparent electrode column at either side of the auxiliary panel to gradually decrease from either side of the width direction of the second transparent electrode column to the middle of the second transparent electrode column to form an equivalent positive lens, and cause the refractive index of a portion of the first liquid crystal layer corresponding to the respective second transparent electrode column in the middle of the auxiliary panel to gradually increase from either side of the width direction of the second transparent electrode column to the middle of the second transparent electrode column to form an equivalent negative lens.

Figure 22:
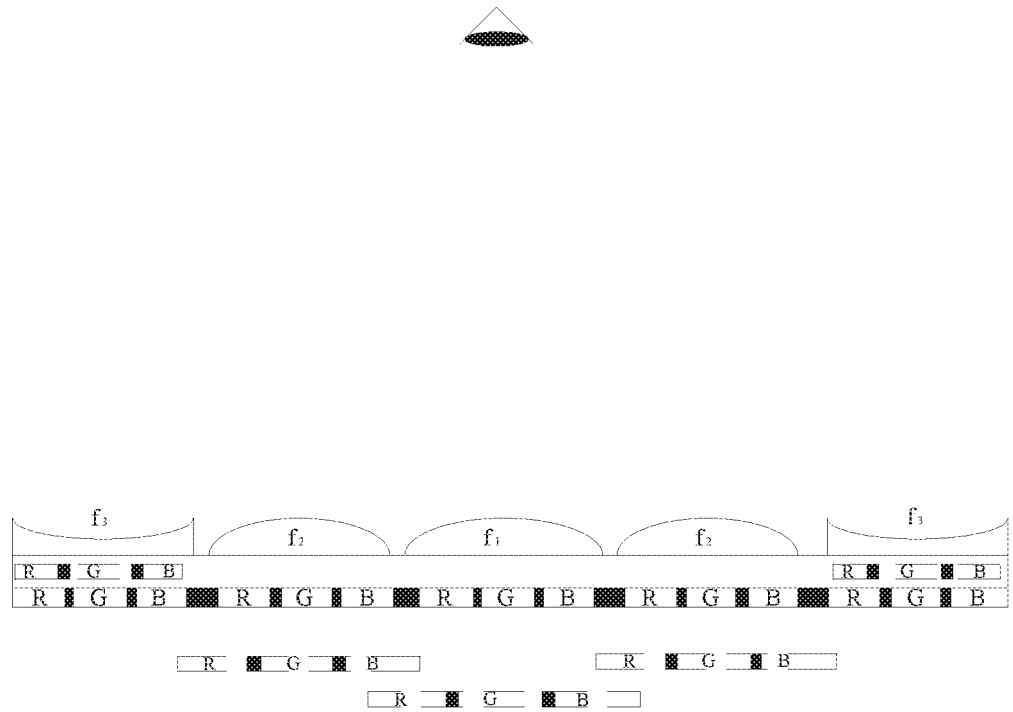
FIG. 22 is a schematic diagram illustrating imaging with a positive lens and a negative lens in combination, the negative lens being on either side of the display panel.

That is, as shown in FIG. 22, the first liquid crystal layer on either side of the auxiliary panel forms an equivalent negative lens, and the first liquid crystal layer in the middle of the auxiliary panel forms an equivalent positive lens. The equivalent positive lens may form an image behind the display device (i.e., at below side in FIG. 22), and the equivalent negative lens may form a reduced virtual image between the display panel and the auxiliary panel.

In an implementation of the present disclosure, the auxiliary panel is divided into three parts in the width direction. The display panel includes a plurality of pixel units arranged in a plurality of rows and columns. The first transparent electrode layer is a planar electrode covering the first base substrate. The second transparent electrode layer includes a plurality of second transparent electrode columns. Each column of pixel units corresponds to at least one second transparent electrode column. The controller is configured to be capable of providing a control signal to the first transparent electrode layer and the respective second transparent electrode columns, to cause the refractive index of a portion of the first liquid crystal layer corresponding to the respective second transparent electrode column at either side of the auxiliary panel to gradually increase from either side of the width direction of the second transparent electrode column to the middle of the second transparent electrode column to form an equivalent positive lens, and cause the refractive index of a portion of the first liquid crystal layer corresponding to the respective second transparent electrode column in the middle of the auxiliary panel to gradually decrease from either side of the width direction of the second transparent electrode column to the middle of the second transparent electrode column to form an equivalent negative lens.

Figure 23:
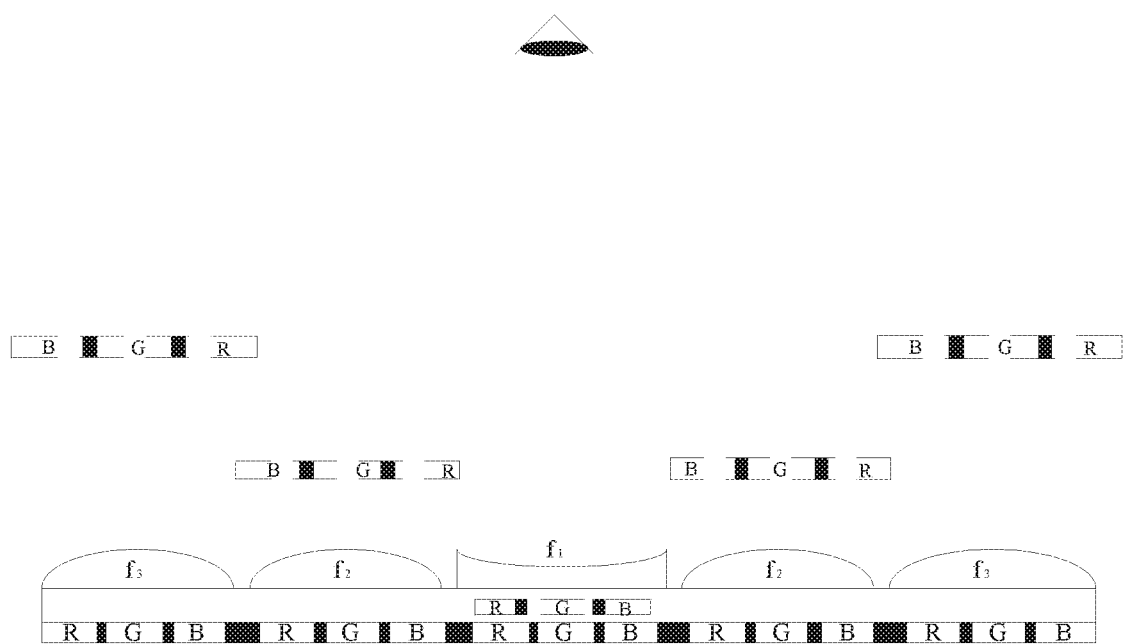
FIG. 23 is a schematic diagram illustrating imaging with a positive lens and a negative lens in combination, the negative lens being on in the middle of the display panel.

As shown in FIG. 23, the first liquid crystal layer on either side of the auxiliary panel forms an equivalent positive lens, and the first liquid crystal layer in the middle of the auxiliary panel forms an equivalent negative lens. The equivalent positive lens may form an inverted image behind the display device (i.e., on the upper side in FIG. 23), and the equivalent negative lens may form an image between the display panel and the auxiliary panel.

It should be noted that in the display panel, parameters of a column of equivalent lenses corresponding to the same column of pixel units are the same.

In the present disclosure, the specific structure of the second transparent electrode column is not particularly limited. For example, each of the second transparent electrode columns includes one or more strip-like transparent electrode strips. That is, one or more transparent electrode strips in the same column form a second transparent electrode column. This structure is simple to manufacture and easy to control. In this case, the portions of the first liquid crystal layer corresponding to the second transparent electrode columns may form one or more equivalent pillar lenses. It should be understood that when one equivalent pillar lens is formed, the length of the equivalent pillar lens is the same as the length of the corresponding column of pixel units. When a plurality of equivalent pillar lenses are formed, the focal lengths of the plurality of equivalent pillar lenses are the same, and the plurality of equivalent pillar lenses are located in the same column.

Of course, the structure of the second transparent electrode column is not limited thereto. For example, each of the second transparent electrode columns includes a plurality of second transparent electrodes. Each of the second transparent electrodes corresponds to one pixel unit, and each second transparent electrode includes a plurality of concentric second transparent electrode rings. In the embodiment shown in FIGS. 7A, 7B, 8A and 8B, a second transparent electrode includes five second transparent electrode rings. When a signal is provided to the second transparent electrode of such construction, the electric field formed between the second transparent electrode and the first transparent electrode layer of such construction may deflect the corresponding liquid crystal molecules to form an equivalent spherical lens. The spherical lens images with a better display effect, and may reduce the astigmatism phenomenon. It should be understood that a column of pixel units corresponds to a plurality of equivalent spherical lenses arranged in one column, and parameters of different equivalent spherical lenses corresponding to different pixel units in the same column are the same.

It is to be understood that the above embodiments are merely illustrative embodiments for the purpose of illustrating the principles of the present disclosure. However, the present disclosure is not limited thereto. It will be apparent to those skilled in the art that various modifications and alterations can be made therein without departing from the spirit and essence of the present disclosure, which are also to be regarded as falling in the scope of the present disclosure.

What is claimed is:

1. A display device, comprising:
a display panel;
a controller; and
an auxiliary panel disposed at a light emitting side of the display panel, the auxiliary panel comprising a first liquid crystal layer, a first substrate and a second substrate disposed opposite to each other to form a cell, the first liquid crystal layer being encapsulated between the first substrate and the second substrate, the first substrate comprising a first base substrate and a first transparent electrode layer disposed on the first base substrate, and the second substrate comprising a second base substrate and a second transparent electrode layer disposed on the second base substrate,
wherein the controller is configured to provide a control signal to the first transparent electrode layer and the second transparent electrode layer to cause different regions of the first liquid crystal layer to have different refractive indices, such that light transmitted from the display panel forms an image on a curved surface having an opening facing a light emitting direction of the display device,
wherein the display panel is an organic light emitting diode display panel,
the display device further comprises an adjustment panel disposed on the light emitting side of the display panel and stacked with the auxiliary panel,
the adjustment panel comprises a third substrate and a fourth substrate disposed to form a cell, and a second liquid crystal layer encapsulated between the third substrate and the fourth substrate,
the initial arrangement direction of the second liquid crystal layer is perpendicular to the initial arrangement direction of the liquid crystal layer,
the third substrate includes a third base substrate and a third transparent electrode layer,
the fourth substrate includes a fourth base substrate and a fourth transparent electrode layer,
the third transparent electrode layer is disposed on the third base substrate in a manner similar to that of the first transparent electrode layer on the first base substrate,
the fourth transparent electrode layer is disposed on the fourth base substrate in the same manner as the second transparent electrode layer on the second base substrate, and
the controller is capable of providing to the adjustment panel with the same signal as that to the auxiliary panel.

2. The display device of claim 1, wherein when the controller does not provide a control signal to the first transparent electrode layer and the second transparent electrode layer, the refractive index is the same for all the regions of the first liquid crystal layer.

3. The display device of claim 1, wherein the display panel comprises a plurality of pixel units arranged in multiple rows and multiple columns, the first transparent electrode layer is a planar electrode covering the first base substrate,
the second transparent electrode layer comprises a plurality of second transparent electrode columns,
each column of pixel units corresponds to at least one of the second transparent electrode columns, and
the controller is configured to be capable of providing a control signal to the first transparent electrode layer and the second transparent electrode columns to cause the refractive index of any portion of the first liquid crystal layer corresponding to any one of the second transparent electrode columns to gradually increase from either side of the second transparent electrode column in a width direction to the middle of the second transparent electrode column, to form an equivalent positive lens, and to cause focal lengths of the equivalent lenses formed by the respective portions of the first liquid crystal layer to gradually decrease from either side of the auxiliary panel to the middle of the auxiliary panel in a width direction of the auxiliary panel.

4. The display device of claim 3, wherein the control signal provided by the controller is capable of causing focal lengths of the equivalent positive lenses formed by the portions of the first liquid layer corresponding to respective second transparent electrode columns on the auxiliary panel to be larger than a distance between the display panel and the auxiliary panel.

5. The display device of claim 4, wherein each column of pixel units corresponds to one of the second transparent electrode columns, and an aperture ratio of the display panel gradually increases from the middle of the display panel to either side of the auxiliary panel.

6. The display device of claim 3, wherein the control signal provided by the controller is capable of causing focal lengths of the equivalent positive lenses formed by the portions of the first liquid layer corresponding to respective second transparent electrode columns on the auxiliary panel to be smaller than a distance between the display panel and the auxiliary panel.

7. The display device of claim 6, wherein each column of pixel units corresponds to one of the second transparent electrode columns, and an aperture ratio of the display panel gradually decreases from the middle of the display panel to either side of the auxiliary panel.

8. The display device of claim 3, wherein the pixel unit comprises a plurality of sub-pixels, each column of sub-pixels corresponds to at least one of the second transparent electrode columns, and
the controller is configured to be capable of providing a same control signal to the plurality of second transparent electrode columns corresponding to the same column of pixel units.

9. The display device of claim 3, wherein the pixel unit comprises a plurality of sub-pixels, each column of sub-pixels corresponds to at least one of the second transparent electrode columns, and
the controller is configured to be capable of providing a control signal to the first transparent electrode layer and the respective second transparent electrode columns, to cause focal lengths of the equivalent lenses formed by the portions of the first liquid crystal layer corresponding to the columns of sub-pixel units on one side of the auxiliary panel to be different from one another, and cause focal lengths of the equivalent lenses formed by the portions of the first liquid crystal layer corresponding to the columns of sub-pixel units on the auxiliary panel to be symmetrically distributed with respect to the center line in the width direction of the auxiliary panel.

10. The display device of claim 3, wherein the auxiliary panel is divided into three parts along the width direction of the auxiliary panel, and the control signal provided by the controller is capable of causing focal lengths of the portions in the first liquid crystal layer corresponding to either side of the auxiliary panel to be smaller than the distance between the auxiliary panel and the display panel, and causing focal lengths of the equivalent positive lenses formed by the portions of the first liquid crystal layer in the middle of the width direction of the auxiliary panel to be larger than the distance between the auxiliary panel and the display panel.

11. The display device of claim 10, wherein for the portion of the display panel corresponding to two lateral portions of the auxiliary panel, from the middle of the width direction of the display panel to either side of the width direction of the display panel, the aperture ratio of the display panel gradually decreases, and for the portion of the display panel corresponding to middle portion of the auxiliary panel, from the middle of the width direction of the display panel to either side of the width direction of the display panel, the aperture ratio of the display panel gradually increases.

12. The display device of claim 10, wherein each pixel unit comprises a plurality of sub-pixels, each column of sub-pixels corresponds to one second transparent electrode column, and focal lengths of the equivalent positive lenses formed by the second transparent electrode columns corresponding to different sub-pixels in the same pixel unit are the same.

13. The display device of claim 1, wherein the display panel comprises a plurality of pixel units arranged in a plurality of rows and columns, the first transparent electrode layer is a planar electrode covering the first base substrate, the second transparent electrode layer comprises a plurality of second transparent electrode columns, each column of pixel units corresponds to at least one of the second transparent electrode columns, and the controller is configured to be capable of providing a control signal to the first transparent electrode layer and the respective second transparent electrode columns, to cause the refractive index of a portion of the first liquid crystal layer corresponding to the respective second transparent electrode column to gradually decrease from either side of the second transparent electrode column in a width direction to the middle of the second transparent electrode column to form an equivalent negative lens, and cause the focal lengths of the equivalent negative lenses formed by the portions of the first liquid crystal layer to gradually, increase from either side to the middle of the auxiliary panel in a width direction of the auxiliary panel.

14. The display device of claim 1, wherein the auxiliary panel is divided into three parts in a width direction, the display panel includes a plurality of pixel units arranged in a plurality of rows and columns, the first transparent electrode layer is a planar electrode covering the first base substrate, the second transparent electrode layer comprises a plurality of second transparent electrode columns, each column of pixel units corresponds to at least one of the second transparent electrode columns, and the controller is configured to be capable of providing a control signal to the first transparent electrode layer and the respective second transparent electrode columns, to cause the refractive index of a portion of the first liquid crystal layer corresponding to the respective second transparent electrode column at either side of the auxiliary panel to gradually decrease from either side of the second transparent electrode column in a width direction to the middle of the second transparent electrode column to form an equivalent positive lens, and cause the refractive index of a portion of the first liquid crystal layer corresponding to the respective second transparent electrode column in the middle of the auxiliary panel to gradually increase from either side of the width direction of the second transparent electrode column to the middle of the second transparent electrode column to form an equivalent negative lens.

15. The display device of claim 1, wherein the auxiliary panel is divided into three parts in a width direction, the display panel includes a plurality of pixel units arranged in a plurality of rows and columns, the first transparent electrode layer is a planar electrode covering the first base substrate, the second transparent electrode layer comprises a plurality of second transparent electrode columns, each column of pixel units corresponds to at least one of the second transparent electrode columns, and the controller is configured to be capable of providing a control signal to the first transparent electrode layer and the respective second transparent electrode columns, to cause the refractive index of a portion of the first liquid crystal layer corresponding to the respective second transparent electrode column at either side of the auxiliary panel to gradually increase from either side of the second transparent electrode column in a width direction to the middle of the second transparent electrode column to form an equivalent positive lens, and cause the refractive index of a portion of the first liquid crystal layer corresponding to the respective second transparent electrode column in the middle of the auxiliary panel to gradually decrease from either side of the width direction of the second transparent electrode column to the middle of the second transparent electrode column to form an equivalent negative lens.

16. The display device of claim 3, wherein each of the second transparent electrode columns comprises one or more strip-like transparent electrode strips.

17. The display device of claim 3, wherein each of the second transparent electrode columns comprises a plurality of second transparent electrodes, each of the second transparent electrodes corresponds to one pixel unit, and each of second transparent electrodes comprises a plurality of concentric second transparent electrode rings.

18. The display device of claim 1, wherein the display panel is a liquid crystal panel, the display panel comprises a first polarizer and a second polarizer, the first polarizer is disposed at a light incident side of the display panel, and the second polarizer is disposed at the light emitting side of the display panel, and the initial arrangement direction of the first liquid crystal layer of the auxiliary panel is parallel to the polarizing direction of the second polarizer.

19. The display device of claim 1, wherein an equivalent lens is formed by the first liquid crystal layer, and a focal length of the equivalent lens at a center portion thereof is different from a focal length of the equivalent lens at a peripheral portion thereof.

* * * * *